(12) United States Patent
Schrum, Jr. et al.

(10) Patent No.: US 8,897,169 B2
(45) Date of Patent: Nov. 25, 2014

(54) DISCOVERY OF CONVENTIONAL DEVICES AND BRIDGES IN HYBRID COMMUNICATION NETWORKS

(75) Inventors: Sidney B. Schrum, Jr., Ocala, FL (US); Richard E. Newman, Gainsville, FL (US)

(73) Assignee: QUALCOMM Incorporated, San Diego, CA (US)

(*) Notice: Subject to any disclaimer, the term of this patent is extended or adjusted under 35 U.S.C. 154(b) by 380 days.

(21) Appl. No.: 13/197,275

(22) Filed: Aug. 3, 2011

(65) Prior Publication Data

US 2012/0224503 A1    Sep. 6, 2012

Related U.S. Application Data

(60) Provisional application No. 61/448,511, filed on Mar. 2, 2011.

(51) Int. Cl.
*H04L 12/28*    (2006.01)
*H04L 12/751*    (2013.01)
*H04L 12/46*    (2006.01)
*H04L 12/64*    (2006.01)

(52) U.S. Cl.
CPC ............ *H04L 45/02* (2013.01); *H04W 40/426* (2013.01); *H04L 12/462* (2013.01); *H04L 2012/6432* (2013.01)
USPC ........... 370/254; 370/351; 370/255; 370/248; 709/238; 709/239; 709/240

(58) Field of Classification Search
None
See application file for complete search history.

(56) References Cited

U.S. PATENT DOCUMENTS 6,130,896 A    10/2000    Lueker et al.
6,272,551 B1    8/2001    Martin et al.
6,421,751 B1    7/2002    Gulick
6,465,927 B2    10/2002    Shiraki et al.
6,765,927 B1    7/2004    Martin et al.
(Continued)

FOREIGN PATENT DOCUMENTS

CN    103348637    10/2013
CN    103403697    11/2013
(Continued)

OTHER PUBLICATIONS

"PCT Application No. PCT/US2011/058506 International Preliminary Report on Patentability", Jul. 12, 2013, 10 pages.
"PCT Application No. PCT/US2012/024763 International Preliminary Report on Patentability", Jun. 18, 2013, 8 pages.
"PCT Application No. PCT/US2012/028254 International Preliminary Report on Patentability", May 10, 2013, 11 pages.
(Continued)

*Primary Examiner* — Anez Ebrahim
(74) *Attorney, Agent, or Firm* — DeLizio Gilliam, PLLC

(57) ABSTRACT

A hybrid network device can implement functionality for automatically detecting and locating legacy bridges in a communication network. In one embodiment, a first network device of a first class of network devices can determine that a second network device of a second class of network devices is communicatively located adjacent to at least one of a plurality of network interfaces of the first network device based, in part, on detecting that a packet originating from the second network device does not include a predetermined tag. The first network device can determine whether network segments associated with the first network device and a target network device are communicatively coupled via a network bridge device of the second class of network devices based on transmitting probe messages to the second network device and determining whether the target network device detected the probe messages.

26 Claims, 4 Drawing Sheets

(56) References Cited

U.S. PATENT DOCUMENTS

| | | | |
|---|---|---|---|
| 6,947,736 | B2 | 9/2005 | Shaver et al. |
| 7,082,134 | B1 | 7/2006 | Lim et al. |
| 7,113,763 | B2 | 9/2006 | Heinonen et al. |
| 7,262,695 | B2 | 8/2007 | Hicks |
| 7,269,403 | B1 | 9/2007 | Miao |
| 7,349,325 | B2 | 3/2008 | Trzeciak et al. |
| 7,391,317 | B2 | 6/2008 | Abraham et al. |
| 7,440,443 | B2 | 10/2008 | Logvinov et al. |
| 7,463,588 | B1 | 12/2008 | Tanaka et al. |
| 7,583,952 | B2 | 9/2009 | Lee et al. |
| 7,725,096 | B2 | 5/2010 | Riveiro et al. |
| 7,751,414 | B2 | 7/2010 | Lee et al. |
| 7,848,337 | B1 | 12/2010 | Weng et al. |
| 8,284,694 | B2 | 10/2012 | Chari et al. |
| 8,619,769 | B2 | 12/2013 | Sandstrom |
| 2004/0078460 | A1 | 4/2004 | Valavi et al. |
| 2004/0133704 | A1 | 7/2004 | Krzyzanowski et al. |
| 2005/0013297 | A1 | 1/2005 | Eriksson |
| 2005/0265308 | A1 | 12/2005 | Barbir et al. |
| 2006/0153153 | A1* | 7/2006 | Bhagwat et al. ............ 370/338 |
| 2006/0240799 | A1* | 10/2006 | Kim et al. ............... 455/343.2 |
| 2006/0245438 | A1* | 11/2006 | Sajassi et al. ............. 370/399 |
| 2006/0251115 | A1 | 11/2006 | Haque et al. |
| 2006/0274752 | A1 | 12/2006 | Jain et al. |
| 2007/0075843 | A1 | 4/2007 | Riveiro et al. |
| 2007/0076666 | A1 | 4/2007 | Riveiro et al. |
| 2007/0223399 | A1* | 9/2007 | Yang et al. ................ 370/254 |
| 2007/0229231 | A1 | 10/2007 | Hurwitz et al. |
| 2007/0280249 | A1 | 12/2007 | Draves, Jr. |
| 2008/0080380 | A1 | 4/2008 | Lee et al. |
| 2008/0130640 | A1 | 6/2008 | Hurwitz et al. |
| 2008/0285441 | A1 | 11/2008 | Abdulla et al. |
| 2008/0317039 | A1 | 12/2008 | Satterlee et al. |
| 2009/0040938 | A1 | 2/2009 | Klinker |
| 2009/0046723 | A1 | 2/2009 | Rahman et al. |
| 2009/0156159 | A1 | 6/2009 | Lim et al. |
| 2009/0160943 | A1 | 6/2009 | Badt, Jr. et al. |
| 2009/0163389 | A1 | 6/2009 | De Campo et al. |
| 2009/0245243 | A1 | 10/2009 | Rangarajan et al. |
| 2009/0252209 | A1 | 10/2009 | Riveiro et al. |
| 2009/0268668 | A1 | 10/2009 | Tinnakornsrisuphap et al. |
| 2009/0285216 | A1 | 11/2009 | Thubert et al. |
| 2009/0310610 | A1 | 12/2009 | Sandstrom |
| 2009/0316584 | A1 | 12/2009 | Tanaka et al. |
| 2009/0323829 | A1 | 12/2009 | Riveiro et al. |
| 2010/0202397 | A1 | 8/2010 | Chari |
| 2010/0332631 | A1 | 12/2010 | Sekine et al. |
| 2011/0063992 | A1* | 3/2011 | Weng et al. .............. 370/252 |
| 2011/0116513 | A1 | 5/2011 | Gilson |
| 2011/0286326 | A1 | 11/2011 | Awano |
| 2012/0163389 | A1 | 6/2012 | Zhang et al. |
| 2012/0207163 | A1 | 8/2012 | Schrum |
| 2012/0230343 | A1 | 9/2012 | Schrum, Jr. |
| 2013/0229909 | A1* | 9/2013 | Rahman et al. ............ 370/216 |

FOREIGN PATENT DOCUMENTS

| | | |
|---|---|---|
| CN | 103416042 | 11/2013 |
| KR | 1010110008270 | 10/2009 |
| KR | 20130121181 | 5/2013 |
| KR | 20130132629 | 12/2013 |
| KR | 20130136522 | 12/2013 |
| WO | 2012122366 | 3/2012 |
| WO | 2012109622 | 8/2012 |
| WO | 2012118531 | 9/2012 |

OTHER PUBLICATIONS

Blanchet M., et al., "Multiple Interfaces and Provisioning Domains Problem Statement; draft-ietf-mif-problem-statement-09.txt", Internet Engineering Task Force, IETF; Standardworkingdraft, Internet Society (!SOC) 4, Rue Des Falaises CH-1205 Geneva, Switzerland, No. 9, Oct. 25, 2010, pp. 1-18, XP015072215, [retrieved on Oct. 25, 2010] Sections 3 to 5 (incl. sub-sections).

Hong, Y.G (Etri, Korea): "Output document of Y.ipv6-vmh "Framework of vertical multi-homing in IPv6-based NGN"";TD 565 (NGN-GSI), ITU-T Drafts: Study Period 2009-2012, International Telecommunication Union, Geneva; CH vol. ngn-gsi; Jul. 2013, Sep. 16, 2010, pp. 1-19, XP917565748. [retrieved on Sep. 16, 2010] p. 7-p. 18.

International Search Report and Written Opinion—PCT/US2012/024763—ISAEPO—Apr. 18, 2012.

International Search Report and Written Opinion—PCT/US2012/028254—ISA/EPO—Sep. 6, 2012.

Wasserman M., et al., "Current Practices for Multiple Interface Hosts; draft-ietf-mif-current-practices-98.txt", Internet Engineering Task Force, I ETF; StandardWorkingDraft, Internet Society (ISOC) 4, Rue des Falaises CH—1205 Geneva, Switzerland, No. 8, Feb. 28, 2011, pp. 1-23, XP015074156, [retrieved on Feb. 28, 2011] Sections 1 to 3 (incl. sub-sections).

"Standard for a Convergent Digital Home Network for Heterogeneous Technologies", IEEE P1905.1 Project Authorization Request (PAR). Available from IEEE. Authorizes a standards development project to define an "abstraction layer" that provides a single common interface to upper layers for devices that implement multiple networking interfaces. Nov. 8, 2010.

IEEE, "Wireless LAN Medium Access Control (MAC) and Physical Layer (PHY) Specifications", IEEE Std 802. Nov. 2007 (Revision of IEEE Std 802.11-1999) http://www.ahltek.com/WhitePaperspdf/802.11-20%20specs/802.11-2007.pdf Jun. 12, 2007, 1232 pages.

Microsoft, "MS-LLTD Link Layer Topology Discovery (LLTD) Protocol Specification", http://msdn.microsoft.com/en-us/library/cc233983(v=prot.10).aspx Feb. 4, 2011, 128 pages.

Volokitin, Yuriy, "LanTopolog", http://www.lantopolog.com/ Date Obtained from the Internet: Mar. 2, 2011 2007, 2 pages.

Co-pending U.S. Appl. No. 13/189,272, filed Jul. 2, 2011, 40 pages.

Co-pending U.S. Appl. No. 13/295,704, filed Nov. 14, 2011, 34 pages.

"HomePlug AV Specification", Version 1.1. Available from HomePlug Powerline Alliance http://www.homeplug.org May 21, 2007.

International Search Report and Written Opinion—PCT/US2011/058506—ISA/EPO—Feb. 7, 2012.

"U.S. Appl. No. 13/189,272 Final Office Action", Sep. 19, 2013, 60 pages.

Cisco Systems, Inc. "Supported Platforms for Unique MAC Address Configuration on VLAN or L3 Interfaces for Catalyst Switches", URL: http://www.cisco.com/image/gif/paws/41263/catmac_41263.pdf retrieved on Feb. 13, 2013 Mar. 2, 2007 , pp. 1-7.

IEEE P1905.1, "Standard for a Convergent Digital Home Network for Heterogeneous Technologies", Project Authorization Request (PAR), Available from IEEE, Authorizes a Standards Development Project to Define an "Abstraction layer" that Provides a Single Common Interface to Upper Layers for Devices that Implement Multiple Networking Interfaces, Nov. 8, 2010.

"PCT Application No. PCT/US2012/028254 Written Opinion of the IPEA", Feb. 18, 2013, 10 pages.

U.S. Appl. No. 13/189,272 Office Action, Apr. 25, 2013, 49 Pages.

U.S. Appl. No. 13/189,272 Office Action, Mar. 26, 2014, 60 Pages.

"European Application No. 11859662.6, European Search Report", Jul. 17, 2014, 9 pages.

"Korean Patent Application No. 2013-7026010, KIPO Notice of Preliminary Rejection", Jul. 21, 2014, 12 pages.

"TCP/IP Tutorial and Technical Overview", TCP/IP Tutorial and Technical Overview, XX, XX, Aug. 1, 2001, pp. 180-197.

Xi, J., et al., "Wireless Nultihop Internet Access: Gateway Discovery, Routing, and Addressing", Proceedings. International Conference on Third Generation Wireless and Beyond, May 28, 2002, pp. 1-6.

"Korean Patent Application No. 2013-7023974, KIPO Notice of Grounds for Rejection", Jul. 16, 2014, 7 pages.

"Korean Patent Application No. 2013-7026320, Notice of Grounds for Rejection", Aug. 11, 2014, 9 pages.

"U.S. Appl. No. 13/189,272 Final Office Action", Aug. 1, 2014, 65 Pages.

* cited by examiner

DISCOVERY OF CONVENTIONAL DEVICES AND BRIDGES IN HYBRID COMMUNICATION NETWORKS

RELATED APPLICATION

This application claims the priority benefit of U.S. Provisional Application Ser. No. 61/448,511 filed on Mar. 2, 2011.

BACKGROUND

Embodiments of the inventive subject matter generally relate to the field of communication systems and, more particularly, to a mechanism for discovery of conventional devices and bridges in a hybrid communication network.

Hybrid communication networks typically comprise multiple networking technologies (e.g., wireless local area network (WLAN) technologies, powerline communication technologies, Ethernet, etc.) that are interconnected using bridging-capable devices that forward packets between devices utilizing the different network technologies and media in order to form a single extended communication network. Typically, the communication mechanisms, and protocol specifics (e.g., device and topology discovery, bridging to other networks, etc.) are unique to each networking technology. The hybrid communication network can comprise hybrid communication devices and conventional (or legacy) communication devices.

SUMMARY

Various embodiments of a mechanism for discovery of conventional devices and bridges in a hybrid communication network are disclosed. In one embodiment, it is determined that at least one of a plurality of network interfaces of a first network device of a first class of network devices is communicatively located adjacent to a second network device of a second class of network devices in a communication network based, at least in part, on detecting that one or more packets received at the at least one of the plurality of network interfaces from the second network device do not comprise a predetermined tag. A probe message is transmitted to the second network device of the second class of network devices via the at least one of the plurality of network interfaces of the first network device. It is determined whether the probe message was detected by at least one of a plurality of network interfaces of a target network device of the first class of network devices that is communicatively located adjacent to the second network device of the second class of network devices. It is determined that a first network segment associated with the at least one of the plurality of network interfaces of the first network device is communicatively coupled to a second network segment associated with the at least one of the plurality of network interfaces of the target network device via a network bridge device of the second class of network devices in response to determining that the probe message was not detected by the target network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
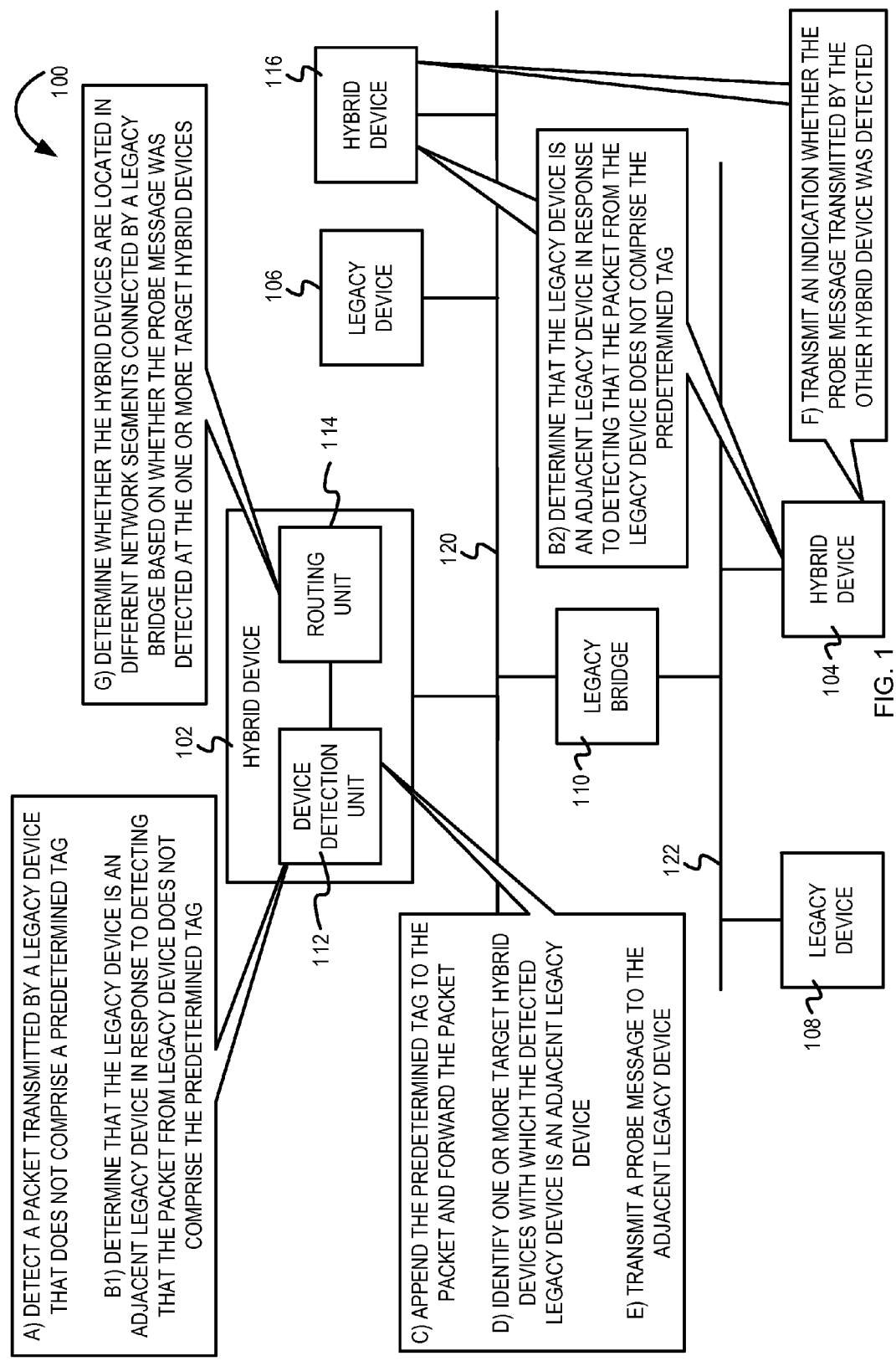
FIG. 1 is an example block diagram illustrating a mechanism for detecting legacy network devices and bridges in a hybrid communication network.

The description that follows includes exemplary systems, methods, techniques, instruction sequences, and computer program products that embody techniques of the present inventive subject matter. However, it is understood that the described embodiments may be practiced without these specific details. For instance, although in some embodiments the conventional bridge discovery mechanism can be implemented for hybrid communication networks comprising wireless local area network (WLAN) devices (e.g., IEEE 802.11n devices), powerline network devices (e.g., HomePlug AV) and Ethernet devices, in other embodiments the conventional bridge discovery mechanism can be implemented in hybrid communication networks that may comprise other suitable types of network devices that implement other standards/protocols (e.g., WiMAX, etc.). In other instances, well-known instruction instances, protocols, structures, and techniques have not been shown in detail in order not to obfuscate the description.

A hybrid communication network (e.g., a hybrid home network) is typically formed by interconnecting communication networks (that support different communication protocols) across different network technologies and communication media. The hybrid communication network can comprise multi-interface communication devices ("hybrid devices") that are configured to operate across multiple networking technologies as well as conventional, single-interface communication devices ("legacy devices"). Typically, the hybrid devices implement topology discovery and other information exchange protocols to advertise their presence to other hybrid devices in the hybrid communication network. However, the legacy devices (including legacy bridges) may not implement the topology discovery and information exchange protocols and may not advertise their presence within the hybrid communication network. The hybrid devices, therefore, may attempt to route packets in the hybrid communication network without being aware of the presence or location of legacy devices and legacy bridges in the hybrid communication network. However, for proper packet routing, the hybrid devices should be aware of the topology of the hybrid communication network. For example, the hybrid devices may implement protocols to improve network performance by evenly dividing the communication load over multiple routes. The presence of legacy bridges of varying capability and that implement various legacy protocols can influence the route selection decisions made by the hybrid devices. For example, a legacy learning bridge typically "learns" the location of various other communication devices (e.g., legacy devices, hybrid devices, etc.) in the hybrid communication network with respect to various interfaces of the legacy learning bridge. The legacy learning bridge in the hybrid communication network may drop incoming packets if the legacy learning bridge detects the same source address on more than one of its interfaces and/or if the interface at which the incoming packets arrive at the legacy learning bridge is inconsistent with what the legacy learning bridge has previously learned. Existing topology discovery techniques may rely on direct exchange of information between communication devices and on manual configuration of virtual LANs, bridge priorities, or explicit provision of topology information that can be too complicated for users.

In some embodiments, hybrid devices can implement a mechanism for automatically detecting and locating legacy learning bridges in a hybrid communication network with little or no user configuration, so that route selection decisions can take into consideration the effects of the legacy learning bridges. The hybrid devices can be configured to mark packets received from legacy devices with a special predetermined tag before forwarding the packets (if needed) to indicate that the packets were routed via a hybrid device. In one implementation, when a hybrid device detects a packet from a legacy device, the hybrid device can determine whether the packet comprises the special predetermined tag. If the hybrid device determines that the packet was received without the predetermined tag, this can indicate that the legacy device is not coupled to the hybrid device via other intermediate hybrid devices. Such a legacy device is herein referred to as an "adjacent legacy device" with respect to the hybrid device (e.g., with respect to at least one communication interface of the hybrid device) at which the packet was detected. The hybrid device can then transmit a probe message to the adjacent legacy device, determine whether one or more other hybrid devices detected the probe message, and consequently determine whether the hybrid device and the one or more other hybrid devices (which may be located in different network segments) are connected via legacy bridges, as will be further described below with reference to FIGS. 1-4. Such a topology discovery mechanism for identifying the presence of legacy learning bridges in a hybrid communication network can improve and simplify the route selection process in the hybrid communication network. By identifying the position of the legacy learning bridges vis-a-vis the hybrid devices, packet routes can be appropriately selected (or avoided) to try to ensure the legacy learning bridges detect the same source addresses at the appropriate "learned" interfaces. This can minimize the probability of dropped packets and improve performance of the hybrid communication network.

FIG. 1 is an example block diagram illustrating a mechanism for detecting legacy devices and bridges in a hybrid communication network 100. As described above, the hybrid communication network 100 can comprise communication devices (e.g., hybrid devices, hybrid bridges, legacy devices, legacy bridges, etc.) that implement one or more different communication protocols (e.g., WLAN, HomePlug AV, Ethernet, etc.), based on various networking standards and operating either wirelessly or over various wired media (powerline, coax cable, unshielded twisted pair telephone cable, CAT5 shielded twisted pair cable, etc.). In some implementations, the hybrid devices can be electronic devices that comprise bridging capabilities in addition to communication capabilities. Such hybrid devices may be referred to as "hybrid bridges." The hybrid devices can also be electronic devices that comprise communication capabilities but do not comprise bridging capabilities. Such hybrid devices may be referred to as "hybrid communication devices." In some implementations, the legacy devices can be electronic devices that comprise bridging capabilities in addition to communication capabilities, which can be referred to herein as "legacy bridges." The legacy devices can also be electronic devices that comprise communication capabilities but do not comprise bridging capabilities. Such legacy devices may be referred to as "legacy communication devices." In FIG. 1, the hybrid communication network 100 comprises two network segments 120 and 122. The network segment 120 comprises hybrid devices 102 and 116, and a legacy device 106. The network segment 122 comprises a hybrid device 104 and a legacy device 108. A legacy bridge 110 couples the network segment 120 and the network segment 122. The hybrid device 102 comprises a device detection unit 112 and a routing unit 114. Likewise, although not depicted in FIG. 1, the hybrid devices 104 and 116 can also comprise their respective device detection units and routing units. It is noted that in some implementations, the hybrid devices 102, 104, and 116 can be hybrid bridges. In some embodiments, the hybrid devices 102, 104, and/or 116 can be hybrid bridges or hybrid communication devices. Likewise, the legacy devices 106 and 108 can be legacy bridges or legacy communication devices.

In some implementations, the hybrid devices 102, 104, and 116 can comprise multiple communication interfaces, each of which connects the hybrid device to different communication networks. For example, the hybrid device 102 can comprise three communication interfaces (e.g., a powerline interface, an Ethernet interface, and a wireless local area network (WLAN) interface) that enable the hybrid device 102 to connect to a powerline communication network, an Ethernet, and a WLAN, respectively. It is noted that even though FIG. 1 does not explicitly show multiple communication interfaces for the hybrid devices 102, 104 and 116, the hybrid devices 102, 104 and 116 can comprise two or more communication interface that couple the hybrid devices to two or more communication networks. The legacy devices typically comprise only one communication interface for communication via the corresponding communication network. For example, the legacy devices 106 and 108 may comprise an Ethernet interface for communication via Ethernet. In some implementations, each of the hybrid devices 102, 104, and 116 can broadcast announcement messages to advertise their presence in the hybrid communication network 100. For example, the hybrid device 102 can broadcast an announcement message (e.g., at predetermined periodic time intervals) comprising an identifier of the hybrid device 102 to announce its presence in the hybrid communication network 100 to the hybrid devices 104 and 116. However, as described above, the legacy devices may not be capable of broadcasting announcement messages (or other similar messages). Therefore, the hybrid devices 102, 104, and 116 can execute operations described below in stages A-G (and also FIGS. 2-3) to discover legacy devices and legacy bridges in the hybrid communication network 100 in order to determine the topology of the hybrid communication network 100.

At stage A, the device detection unit 112 of the hybrid device 102 detects a packet transmitted by the legacy device 106 that does not comprise a predetermined tag. For example, the legacy device 106 may transmit the packet to another legacy device via the hybrid device 102. As another example, the packet transmitted by the legacy device 106 may be intended for the hybrid device 102. As another example, the legacy device 106 may broadcast a packet in the hybrid communication network 100 at periodic intervals and the hybrid device 102 can detect the broadcasted packet. In some implementations, in response to detecting the packet from the legacy device 106, the device detection unit 112 can read a predetermined field in the received packet to determine whether the received packet comprises the predetermined tag. The predetermined tag can be any suitable combination of characters, numbers, and symbols (e.g., any suitable combination of zeros and ones). In one implementation, the predetermined tag can be a virtual local area network (VLAN) tag. In another implementation, the predetermined tag may be a static tag (e.g., hardcoded as part of the hybrid devices during manufacturing), while in other implementations the hybrid devices 102, 104, and 116 in the hybrid communication network 100 can negotiate and agree upon the value of the predetermined tag. In another implementation, a user may configure/select the value of the predetermined tag.

At stage B1, the device detection unit 112 determines that the legacy device 106 is an adjacent legacy device in response to detecting that the packet from legacy device 106 does not comprise the predetermined tag. In some implementations, the hybrid devices 102, 104, and 116 may be configured to append the predetermined tag to any packet received from a legacy device prior to forwarding the received packet to the intended destination device. If the hybrid device 102 receives the packet from the legacy device 106 without the predetermined tag, this can indicate that there are no other hybrid devices along the route between the hybrid device 102 and the legacy device 106 (e.g., along the route between at least one of the interfaces of the hybrid device 102 and the legacy device 106). In other words, receiving the packet from the legacy device 106 without the predetermined tag can identify the legacy device 106 as an "adjacent legacy device" with respect to the hybrid device 102 (e.g., with respect to at least one of the interfaces of the hybrid device 102). In some implementations, in response to determining that the legacy device 106 is an adjacent legacy device with respect to the hybrid device 102, the device detection unit 112 can broadcast an "adjacent device identification" message to the other hybrid devices 104 and 116 in the hybrid communication network 100. The adjacent device identification message can comprise an identifier (e.g., a network address, a device address, etc.) associated with the adjacent legacy device 106 and an identifier associated with the hybrid device 102. In another implementation, the device detection unit 112 can broadcast an indication of the adjacent legacy device 106 in any suitable message (e.g., a beacon message, a periodic synchronization message, etc.).

It is noted that, in some implementations, the legacy device 106 does not have to be physically adjacent to the hybrid device 102 (as depicted in FIG. 1) in order to be considered an "adjacent legacy device." Instead, the legacy device 106 may only be "communicatively located adjacent" to at least one interface of the hybrid device 102. In other words, with reference to the example of FIG. 1, even though a packet transmitted by the legacy device 108 to the hybrid device 102 may pass through the legacy bridge 110 (another legacy device), it may not pass through another hybrid device. In other words, the packet route between the legacy device 108 and the hybrid device 102 does not comprise any intermediate hybrid devices. Therefore, the device detection unit 112 may receive the packet transmitted by the legacy device 106 without the predetermined tag, and may determine that the legacy device 106 is an adjacent legacy device with respect to the hybrid device 102.

At stage B2, the hybrid device 104 determines that the legacy device 106 is an adjacent legacy device in response to detecting that the packet received from legacy device 106 does not comprise the predetermined tag. As described above in stages A and B1, a device detection unit (not shown) of the hybrid device 104 can detect that the packet transmitted by the legacy device 106 does not comprise the predetermined tag. The hybrid device 104 can determine that there are no other hybrid devices along the packet route between the hybrid device 104 and the legacy device 106. Consequently, the hybrid device 104 can identify the legacy device 106 as an "adjacent legacy device" with respect to the hybrid device 104 (e.g., with respect to at least one of the interfaces of the hybrid device 104). Furthermore, as described above in stage B1, the hybrid device 104 may indicate (to the other hybrid devices 102 and 116 in the hybrid communication network 100) that the legacy device 106 is an adjacent legacy device with respect to the hybrid device 104 by sending an adjacent device identification message or another suitable message. Likewise, at stage B2, the hybrid device 116 can also determine (and announce) that the legacy device 106 is an adjacent legacy device in response to detecting that the packet received from legacy device 106 does not comprise the predetermined tag.

At stage C, the device detection unit 112 appends the predetermined tag to the packet and forwards the packet. As described above, the hybrid devices 102, 104, and 116 can be configured to append the predetermined tag (e.g., a VLAN tag) to all packets received at at least one of the interfaces of the hybrid device from an adjacent legacy device. Appending the predetermined tag to packets received from the adjacent legacy device can enable other hybrid devices to identify whether or not the legacy device is an adjacent legacy device. Tagging packets received from the legacy device can enable the other hybrid devices that subsequently detect the packet to determine whether the packet was forwarded by another hybrid device (e.g., a hybrid bridge or a hybrid communication device) or whether the packet was forwarded by a legacy bridge. For example, the device detection unit 112 may append the predetermined tag to the packet received from the legacy device 106 and may forward the packet to a destination hybrid device connected on a different network segment. In response to receiving the packet (that was tagged by the hybrid device 102), the destination hybrid device can determine that the hybrid device 102 is one of the forwarding devices along the route between the legacy device 106 and the destination hybrid device.

At stage D, the device detection unit 112 identifies one or more target hybrid devices with which the legacy device 106 is an adjacent legacy device. For example, after the device detection unit 112 determines that the legacy device 106 is an adjacent legacy device with respect to the hybrid device 102, the device detection unit 112 can determine whether the legacy device 106 is an adjacent legacy device with respect to one or more other hybrid devices. In some implementations, the device detection unit 112 can listen for adjacent device identification messages transmitted by other hybrid devices in the hybrid communication network 100. In the example of FIG. 1, the device detection unit 112 can detect adjacent device identification messages transmitted by the hybrid devices 104 and 116, and determine that the legacy device 106 is an adjacent legacy device with respect to the hybrid devices 104 and 116. The hybrid devices 104 and 116 that share a common adjacent legacy device (e.g., the legacy device 106) with the hybrid device 102 are referred to herein as "target hybrid devices." After the device detection unit 112 identifies the target hybrid devices 104 and 116, the device detection unit 112 can probe the adjacent legacy device 106 to determine the position of the adjacent legacy device 106 with respect to the hybrid devices 102, 104, and 116, and to determine whether a legacy bridge connects two or more of the hybrid devices 102, 104, and 116.

At stage E, the device detection unit 112 transmits a probe message to the adjacent legacy device 106. In some implementations, the device detection unit 112 can transmit the probe message to the adjacent legacy device 106 via the communication interface (of the hybrid device 102) on which the packet from the legacy device 106 was detected. The probe message can enable the device detection unit 112 to determine the position of the legacy device 106 in the hybrid communication network 100 vis-à-vis the hybrid devices 102, 104, and 116. More specifically, transmitting the probe message to the adjacent legacy device 106 can enable the device detection unit 112 to determine whether the hybrid device 102 and the target hybrid devices 104 and 116 are part of a common network segment, or part of different network segments coupled by a legacy bridge. In some implementations, the device detection unit 112 can transmit the probe message to the adjacent legacy device 106 as soon as the device detection unit 112 identifies the one or more target hybrid devices 104 and 116 that are also adjacent to the legacy device 106. In another implementation, the device detection unit 112 can communicate with the target hybrid devices 104 and 116 and can negotiate a communication schedule in which the probe messages should be transmitted to the adjacent legacy device 106. In another implementation, the device detection unit 112 can transmit a probe start message to the target hybrid devices 104 and 116 to indicate that probe messages will be transmitted to the adjacent legacy devices to discover the topology of the hybrid communication network 100. The device detection unit 112 can also transmit a probe stop message to indicate (to the target hybrid devices 104 and 116) that probe messages have been transmitted to all the adjacent legacy devices. In some implementations, the device detection unit 112 may identify multiple adjacent legacy devices and may transmit a unicast probe message to each identified adjacent legacy device. In another implementation, the device detection unit 112 can transmit a multi-cast probe message to two or more identified adjacent legacy devices.

At stage F, the target hybrid device 104 indicates whether the probe message transmitted to the adjacent legacy device 106 was detected at the target hybrid device 104. In some implementations, the device detection unit 112 can notify the target hybrid device 104 (e.g., via a notification message) when (e.g., a time instant at which) the probe message is transmitted (or is scheduled to be transmitted) to the adjacent legacy device 106. In one example, the device detection unit 112 can also notify the target hybrid device 104 how many probe messages are (or will be) transmitted to the adjacent legacy device 106. The target hybrid device 104 can wait for a predetermined time interval (configured based on the number of probe messages that are transmitted, the length of the probe messages, maximum allowable network delay, etc.) to receive the probe messages. In response to detecting one or more of the probe messages intended for the adjacent legacy device 106, the target hybrid device 104 can transmit an acknowledgment message to the initiating hybrid device 102 to indicate detection of the probe message(s). Alternately, if the target hybrid device 104 does not detect any of the probe messages, the target hybrid device 104 can indicate (e.g., after the predetermined time interval elapses) that none of the probe messages were detected. In another implementation, the hybrid device 102 can transmit one or more probe messages to the adjacent legacy device 106, wait for the predetermined time interval, and then query the target hybrid device 104 to determine whether the one or more probe messages were detected at the target hybrid device 104. In the example shown in FIG. 1, the target hybrid device 104 can indicate that the probe message transmitted from the hybrid device 102 to the adjacent legacy device 106 was not detected at the target hybrid device 104 (e.g., since the target hybrid device 104 is located in a different network segment separated by a legacy bridge). The target hybrid device 116 can indicate that the probe message transmitted from the hybrid device 102 to the adjacent legacy device 106 was detected at the target hybrid device 116 (e.g., since the hybrid device 116 is located in the same network segment as the initiating hybrid device 102).

At stage G, the routing unit 114 determines whether the hybrid devices are located in different network segments connected by a legacy bridge based on whether the probe message was detected at the one or more target hybrid devices. In the example of FIG. 1, the routing unit 114 can determine that the probe message transmitted to the adjacent legacy device 106 was not detected at the target hybrid device 104. This can indicate that the hybrid device 102 and the target hybrid device 104 are located in different network segments 120 and 122 that are connected by the legacy bridge 110. In the example of FIG. 1, the routing unit 114 can determine that the probe message transmitted to the adjacent legacy device 106 was detected at the target hybrid device 116. Determining that the probe message transmitted to the adjacent legacy device 106 was detected at the target hybrid device 116 can indicate (e.g., to the routing unit 114) that there are no legacy bridges between the legacy device 106 and the hybrid device 116. Although not described in FIG. 1, it is noted that each of the hybrid devices 102, 104, and 116 that identified the legacy device 106 as an adjacent legacy device can transmit a probe message to the legacy device 106, and then determine whether the probe message was detected by one or more of the other hybrid devices. This can enable the hybrid devices 102, 104, and 116 to determine, verify, and update the estimation of the topology of the hybrid communication network 100 (e.g., the location of the legacy bridges relative to the hybrid devices). Operations of the routing unit 114 determining the topology of the hybrid communication network 100 will further be described with reference to FIG. 3. The routing unit 114 can then use the knowledge of the topology of the hybrid communication network 100 for efficient packet routing through bridged network segments.

Figure 2:
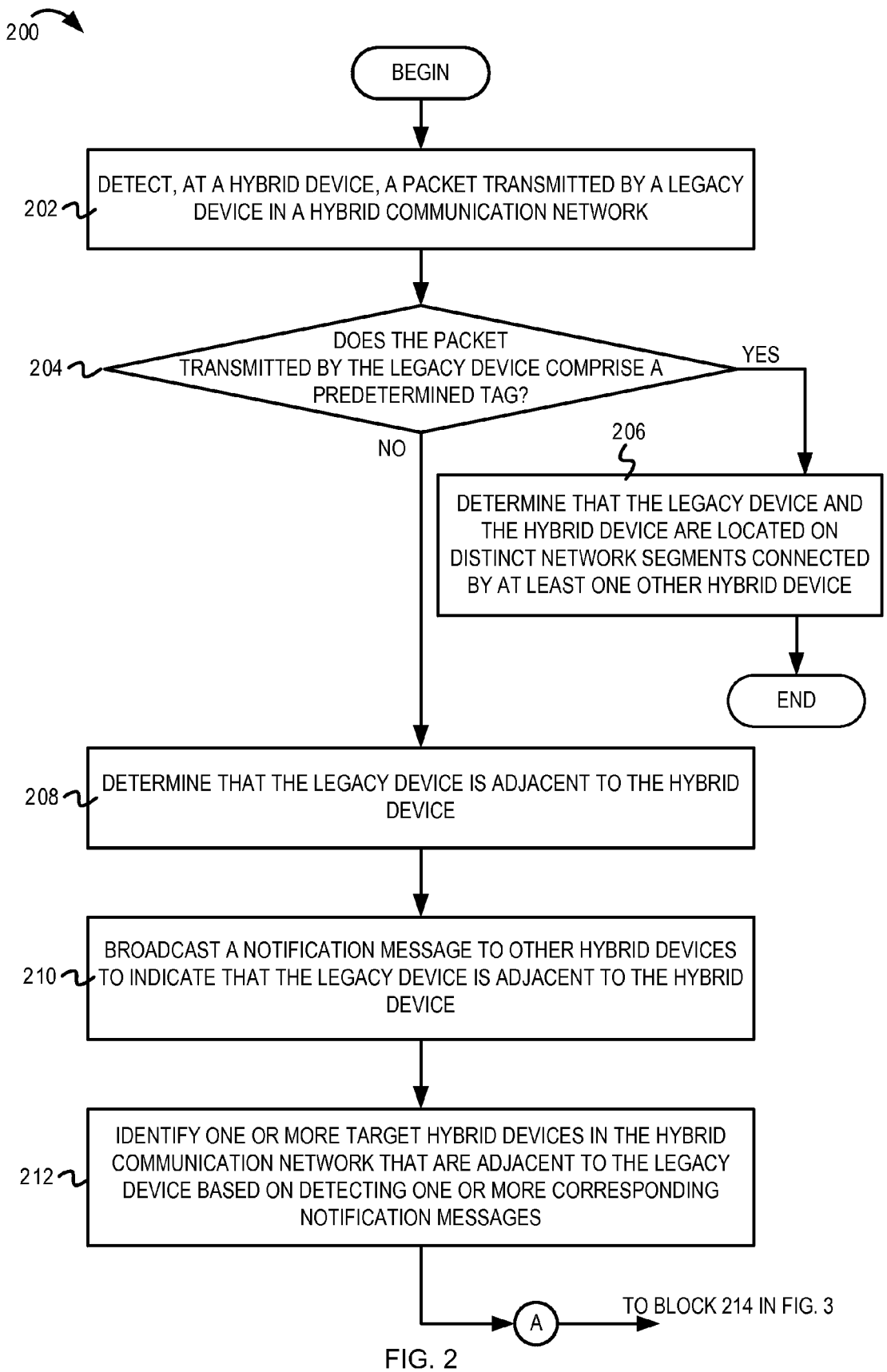
FIG. 2 is a flow diagram illustrating example operations for identifying legacy network devices and bridges in a hybrid communication network.
Figure 3:
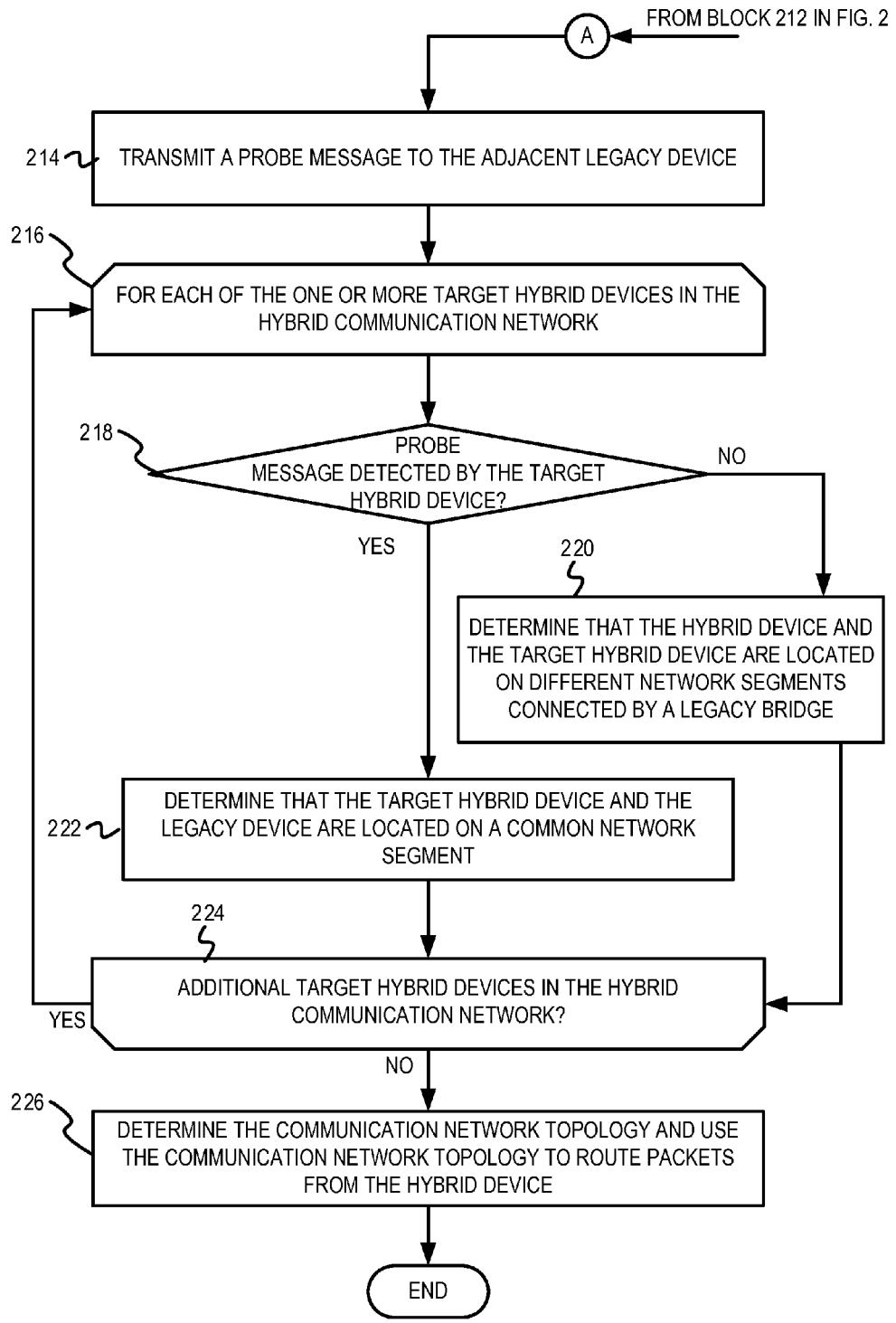
FIG. 3 is a continuation of FIG. 2 and also illustrates example operations for identifying legacy network devices and bridges in a hybrid communication network.

FIG. 2 and FIG. 3 depict a flow diagram ("flow") 200 illustrating example operations for identifying legacy network devices in a hybrid communication network. The flow 200 begin at block 202 in FIG. 2.

At block 202, a hybrid device detects a packet transmitted by a legacy device in a hybrid communication network. As described above, in one example, the hybrid device can be a hybrid bridge and the legacy device can be a legacy communication device. With reference to the example of FIG. 1, the device detection unit 112 of the hybrid device 102 can detect a packet transmitted by the legacy device 106. As described above in stage A of FIG. 1, the packet transmitted by the legacy device 106 can be a unicast packet intended for the hybrid device 102, a packet to be forwarded by the hybrid device 102 to another destination device, a multicast packet, a broadcast packet, etc. In some implementations, the legacy device 106 may transmit a test packet (e.g., comprising a NULL payload or a predetermined payload). In other implementations, the legacy device 106 may transmit a control packet or a data packet comprising control information and/or data intended for the destination device. The flow continues at block 204.

At block 204, it is determined whether the packet transmitted by the legacy device comprises a predetermined tag. For example, the device detection unit 112 can determine whether the packet (detected at block 202) comprises the predetermined tag. As described above in FIG. 1, the hybrid devices can be configured to insert the predetermined tag into any packet received directly from an adjacent legacy device (i.e., without being routed by another hybrid device). The presence of the predetermined tag can indicate that there exist one or more other hybrid devices along the route between the legacy device 106 and the hybrid device 102. Alternately, the absence of the predetermined tag can indicate that the there are no hybrid devices along the route between the legacy device 106 and the hybrid device 102 (i.e., the legacy device 106 is an adjacent legacy device). If it is determined that the packet transmitted by the legacy device comprises the predetermined tag, the flow continues at block 206. Otherwise, the flow continues at block 208.

At block 206, it is determined that the legacy device and the hybrid device are located on distinct network segments connected by at least one other hybrid device. The flow 200 moves from block 204 to block 206 if the device detection unit 112 determines that the packet transmitted by the legacy device 106 comprises the predetermined tag. Because the received packet comprises the predetermined tag, the device detection unit 112 can determine that the packet was routed from the legacy device 106 to the hybrid device 102 via another intermediate hybrid device (e.g., that appended the predetermined tag to the packet). The device detection unit 112 can also determine that the hybrid device 102 would have directly received the packet from the legacy device 106 (e.g., without the predetermined tag) if the legacy device 106 and the hybrid device 102 were part of the same network segment. Thus, the device detection unit 112 can infer that the legacy device 106 and the hybrid device 102 are located on different network segments connected by one or more hybrid devices. In some implementations, the routing unit 114 of the hybrid device 102 can store (e.g., in a routing data structure) routing information associated with the legacy device 106. For example, the routing unit 114 can store an identifier associated with the legacy device 106, an identifier associated with the one or more intermediate hybrid devices (if known), an interface (or port) on which the packet from the legacy device 106 was detected, etc. The routing unit 114 can use this routing information to route subsequent packets to the legacy device 106. From block 206, the flow ends.

At block 208, the hybrid device determines that the legacy device is adjacent to the hybrid device. The flow 200 moves from block 204 to block 208 if the device detection unit 112 determines that the packet transmitted by the legacy device 106 does not comprise the predetermined tag. Because the received packet does not comprise the predetermined tag, the device detection unit 112 can infer that the packet was directly transmitted from the legacy device 106 to the hybrid device 102 or that the packet was routed from the legacy device 106 to the hybrid device 102 via one or more legacy bridges. In other words, because the received packet does not comprise the predetermined tag, the device detection unit 112 can determine that the route between the hybrid device 102 and the legacy device 106 does not comprise any other hybrid devices. It is also noted that if the device detection unit 112 detects the packet from the legacy device 106 at one of the multiple communication interfaces of the hybrid device 102, the legacy device 106 can be considered to be an adjacent legacy device with respect to that communication interface of the hybrid device 102. In other words, the device detection unit 112 can determine whether the legacy device 106 is adjacent to the hybrid device 102 on an interface-by-interface basis. In some implementations, the routing unit 114 may also store an identifier associated with the legacy device 106 and an indication of the interface/port of the hybrid device 102 on which the packet was detected. After the device detection unit 112 identifies the legacy device 106 as an adjacent legacy device with respect to the hybrid device 102 (e.g., with respect to at least one communication interface of the hybrid device 102), the flow continues at block 210.

At block 210, a notification message is broadcast to other hybrid devices to indicate that the legacy device is adjacent to the hybrid device. For example, as described above with reference to FIG. 1, the device detection unit 112 can broadcast an adjacent device identification message (or another suitable message) to indicate that the legacy device 106 is an adjacent legacy device with respect to the hybrid device 102. The adjacent device identification message can comprise an identifier associated with the adjacent legacy device 106, an identifier associated with the hybrid device 102, an identifier associated with the corresponding interface of the hybrid device 102 on which the packet was detected, etc. The flow continues at block 212.

At block 212, one or more target hybrid devices in the hybrid communication network that are adjacent to the legacy device are identified based on detecting one or more corresponding notification messages. For example, on determining that the legacy device 106 is adjacent to the hybrid device 102, the device detection unit 112 can attempt to identify one or more target hybrid devices for which the legacy device 106 is an adjacent legacy device. For example, the device detection unit 112 can listen for and can receive one or more adjacent device identification messages from corresponding one or more hybrid devices in the hybrid communication network 100. The device detection unit 112 can read the multiple adjacent device identification messages and can identify the one or more target hybrid devices for which the legacy device 106 is an adjacent legacy device. With reference to the example of FIG. 1, the device detection unit 112 determines that the legacy device 106 is also adjacent to at least one of the interfaces of the target hybrid devices 104 and 116. The flow continues at block 214 in FIG. 3, where the device detection unit 112 can probe the adjacent legacy device 106 to determine whether a legacy bridge couples the hybrid device 102 with the hybrid devices 104 and 116.

At block 214, a probe message is transmitted to the adjacent legacy device. For example, the device detection unit 112 can transmit the probe message to the adjacent legacy device 106. As will be further described below, transmitting the probe message to the adjacent legacy device 106 can enable the device detection unit 112 to determine whether the hybrid device 102 and the one or more target hybrid devices 104 and 116 are part of a common network segment or part of different network segments coupled by a legacy bridge (e.g., based on whether the one or more target hybrid devices 104 and 116 detected the probe message). In some implementations, the device detection unit 112 can transmit the probe message to the adjacent legacy device 106 via the communication interface (of the hybrid device 102) on which the packet from the legacy device 106 was detected (at block 202). The flow continues at block 216.

At block 216, a loop is initiated for each of the one or more target hybrid devices in the hybrid communication network. For example, the device detection unit 112 can initiate the loop to determine whether the probe message transmitted to the adjacent legacy device 106 was detected by the one or more target hybrid devices 104 and 116, as will be described below. The flow continues at block 218.

At block 218, it is determined whether the probe message was detected by the target hybrid device. For example, the device detection unit 112 can determine whether the probe message (transmitted to the adjacent legacy device 106 at block 214) was detected at the target hybrid device 104. As described above in FIG. 1, in some implementations, the device detection unit 112 can query the target hybrid device 104 to determine whether the probe message transmitted to the legacy device 106 was detected at the target hybrid device 104. The device detection unit 112 can receive a response message that indicates whether the probe message was detected at the target hybrid device 104. In another implementation, the target hybrid device 104 may be configured to automatically transmit an indication of whether the probe message was detected at the target hybrid device 104. For example, on detecting the probe message, the target hybrid device 104 may automatically transmit an indication that the probe message was detected at the target hybrid device 104. As another example, if the probe message is not detected within a predetermined time interval, the target hybrid device 104 may indicate that the probe message was not detected at the target hybrid device 104. In some implementations, the communication interfaces of the target hybrid devices 104 and 116 may be configured to snoop, receive, and process unicast packets that are intended for the legacy device 106. It is noted that in some implementations, whether the target hybrid devices 104 and 116 detect the probe message transmitted by the hybrid device 102 may depend on the learning capabilities and learning behavior of the legacy bridge 110. For example, after the legacy bridge 110 "learns" that legacy device 106 is associated with the network segment 120, the legacy bridge 110 may not forward unicast packets intended for the legacy device 106 from the network segment 120 onto the network segment 122. Consequently, the target hybrid device 104 may not detect the probe messages transmitted from the hybrid device 102 to the legacy device 106. If it is determined that the probe message intended for the adjacent legacy device 106 was detected at the target hybrid device 104, the flow continues at block 222. Otherwise, the flow continues at block 220.

At block 220, it is determined that the hybrid device and the target hybrid device are located on different network segments connected by a legacy bridge. The flow 200 moves from block 218 to block 220 if the device detection unit 112 determines that the probe message was not detected at the target hybrid device 104. When the hybrid device 102 transmits the probe message to the adjacent legacy device 106, the legacy bridge 110 connecting the network segments 120 and 122 may receive the probe message. The legacy bridge 110 can determine (e.g., based on forwarding tables, based on previously learned topology, etc.) that the legacy device 106 and the hybrid device 102 are connected to the same port (e.g., to the same interface) of the legacy bridge 110. For example, the legacy bridge 110 may receive the probe message on port 1, determine that the legacy device 106 is also connected on port 1, and may therefore not forward the probe message (e.g., to another port associated with the network segment 122). The hybrid device 104 connected to the network segment 122 may therefore not detect the probe message transmitted from the hybrid device 102 to the legacy device 106. As described above, the probe message can be transmitted to the legacy device 106 via the same interface of the hybrid device 102 on which the packet was received from the legacy device. Based on knowledge that the probe message transmitted to the legacy device 106 was received by the legacy device 106 but was not detected by the target hybrid device 104, the routing unit 114 can infer that the target hybrid device 104 is not connected to that interface of the hybrid device 102. In other words, the routing unit 114 can infer that the hybrid device 102 and the target hybrid device 104 are located on different network segments connected by at least one legacy bridge (e.g., the legacy bridge 110). The flow continues at block 224.

At block 222, it is determined that the target hybrid device and the legacy device are located on a common network segment. The flow 200 moves from block 218 to block 222 if the device detection unit 112 determines that the probe message was detected by the target hybrid device 116. In the example of FIG. 1, the target hybrid device 116 can detect probe messages transmitted from the hybrid device 102 to the legacy device 106. This can indicate that the legacy device 106 and the target hybrid device 116 are located on a common network segment 120 and that the target hybrid device 116 and the legacy device 106 are not connected by a legacy bridge. Likewise, if the hybrid device 102 detects probe messages transmitted from the target hybrid device 116 to the legacy device 106, this can indicate that the legacy device 106 and the hybrid device 102 are located on a common network segment 120. In other words, the routing unit 114 can determine that the hybrid device 102 and the legacy device 106 are not connected by a legacy bridge. The flow continues at block 224.

At block 224, it is determined whether there exist other target hybrid devices in the hybrid communication network. If the device detection unit 112 determines that there exist other hybrid devices in the hybrid communication network, the flow loops back to block 216, where the device detection unit 112 can identify the next target hybrid device and can determine whether the probe message intended for the adjacent legacy device 106 was detected at the next target hybrid device. Otherwise, the flow continues at block 226. It is noted that although FIG. 3 depicts the target hybrid devices being analyzed sequentially (in blocks 218-224), in other embodiments, the target hybrid devices can be analyzed simultaneously.

At block 226, the communication network topology is determined and is used to route packets from the hybrid device. In some implementations, the routing unit 114 can determine the communication network topology based on whether probe messages transmitted by the hybrid device 102 were detected at each of the target hybrid devices 104 and 116 in the hybrid communication network 100. The routing unit 114 can also determine the communication network topology based on detecting packets from the legacy devices, transmitting and detecting probe messages, detecting broadcast announcement messages from other hybrid devices, etc. For example, the hybrid device 102 can store an indication of one or more legacy devices that were deemed to be adjacent to each of the hybrid devices 102, 104, and 116 in the hybrid communication network 100. The initiating hybrid device 102 can also store an indication of whether probe messages transmitted to the one or more adjacent legacy devices were detected by each of the target hybrid devices 104 and 116. Accordingly, the routing unit 114 can infer the topology of the hybrid communication network 100. In some implementations, the hybrid device 102 can also listen for probe messages transmitted by other hybrid devices 104 and 116 to the adjacent legacy device 106. Configuring each of the hybrid devices 102, 104, and 116 adjacent to a particular legacy device 106 to transmit probe messages can enable the hybrid devices 102, 104, and 116 to verify and to correct (if necessary) their estimation of the topology of the hybrid communication network 100.

As part of the topology of the hybrid communication network 100, the routing unit 114 can determine the position of legacy bridges in the hybrid communication network 100 with respect to each of the hybrid devices 102, 104, and 116. For example, the routing unit 114 can identify network segments to which each of the legacy devices and hybrid devices belong, determine whether the hybrid devices 102, 104, and 116 are located on the same network segment, determine whether the network segments are connected by legacy bridges or hybrid bridges, etc. The routing unit 114 can also identify interfaces of the hybrid devices 102, 104, 116 to which the legacy devices 106 and 108 are connected, interfaces of the hybrid devices 102, 104, 116 to which the other hybrid devices are connected, etc. Referring to the example of FIG. 1, the routing unit 114 can determine that at least one communication interface of the hybrid devices 102 and 116 are connected to the same network segment 120. The routing unit 114 can also determine that the communication interfaces of hybrid devices 102 and 104 are connected to different network segments—connected via the legacy bridge 110.

Additionally, the routing unit 114 can also broadcast the estimated topology of the hybrid communication network 100 to the other hybrid devices 104 and 116. Based on the estimated communication network topology, the routing unit 114 can select an appropriate packet route for transmitting a packet to a destination device through the hybrid communication network 100. Furthermore, if there are multiple available packet routes to the destination device, the routing unit 114 can use the communication network topology information to identify the preferred (or most efficient) packet route for routing the packet to the destination device. When selecting the preferred packet route, the routing unit 114 can take various factors into consideration including, whether the source and the destination hybrid devices are located on different network segments, whether any of the packet routes between the source and the destination hybrid devices comprises one or more legacy bridges, whether a packet route that does not comprise any legacy bridges is available, and whether the legacy bridges will receive the packet on a previously determined interface/port. For example, if one of multiple packet routes between a source hybrid device and a destination hybrid device is not in accordance with the communication network topology previously learned by the legacy bridge, the source hybrid device can determine not to select that packet route to minimize/prevent confusion of the legacy bridge. From block 226, the flow ends.

It should be understood that FIGS. 1-3 are examples meant to aid in understanding embodiments and should not be used to limit embodiments or limit scope of the claims. Embodiments may perform additional operations, fewer operations, operations in a different order, operations in parallel, and some operations differently. It is noted that in some implementations, to enable the hybrid devices to distinguish between a single network segment with a large propagation delay and two network segments coupled by a legacy bridge, the length of probe message transmitted by the hybrid devices can be the maximum allowable packet size. After the initiating hybrid device 102 transmits the probe message to the adjacent legacy device 106, the target hybrid device 104 can wait to detect the probe message for a predetermined time delay (e.g., a sum of a maximum packet transmission time interval and a maximum propagation delay time interval). After the predetermined time delay elapses, the target hybrid device 104 can indicate whether or not the probe message was detected In some implementations, the hybrid device 102 can transmit multiple probe messages to the same adjacent legacy device 106 and can determine whether some/all or none of the probe messages were detected by the one or more other target hybrid devices 104 and 116. The hybrid device 102 and the target hybrid device 104 can be considered part of distinct network segments coupled by the legacy bridge 110 if the target hybrid device 104 does not detect any of the probe messages transmitted to the adjacent legacy device 106. Transmitting multiple probe messages can minimize the errors due to network delays, network congestion, etc.

It is also noted that in some implementations, the network topology discovery operations described herein may be executed in conjunction with one or more other network topology discovery techniques and/or other route selection techniques. For example, network topology discovery operations described herein may be executed in conjunction with the Bridge Spanning Tree Protocol (STP). As another example, the network topology discovery operations may be executed in conjunction with load level analysis techniques. In some implementations, a hybrid device 102 can analyze communication load levels at each of the interfaces to which the hybrid device 102 is connected to a network segment. The hybrid device can broadcast the determined communication load levels associated with each of the interfaces to other hybrid devices in the hybrid communication network 100 and can similarly receive communication load level information from the other hybrid devices. The hybrid device 102 can determine whether the communication load level on a particular network segment is approximately equal to the communication load level as seen by all the other hybrid devices connected to that network segment. In some implementations, one of the hybrid devices can artificially increase the communication load level on the network segment (e.g., by transmitting one or more test messages) at predetermined time instants and can determine whether the increase in the communication load level was detected at other hybrid devices. The hybrid devices that detect a corresponding increase in the communication load levels can be considered part of the same network segment.

As another example, the network topology discovery operations may be executed in conjunction with analysis of dropped packets. In some implementations, the legacy bridges may be configured to drop any VLAN tagged packet with a canonical format indicator (CFI) flag set to "1." To detect the presence of a legacy bridge, an initiating hybrid device 102 can transmit test messages comprising a VLAN tag and the CFI flag set to "1" to a destination hybrid device 104. The initiating hybrid device 102 can also transmit test messages comprising the VLAN tag and the CFI flag set to "0" to the destination hybrid device 104. If the initiating hybrid device 102 determines that the destination hybrid device 104 detected the test messages with the CFI flag set to "0" and did not detect the test messages with the CFI flag set to "1", the initiating hybrid device 102 can infer the presence of a legacy bridge between the initiating hybrid device 102 and the destination hybrid device 104.

Lastly, it is noted that a hybrid device can be any suitable network device of a "first class of communication devices" that comprises multiple communication interfaces and that is configured to operate across multiple networking technologies. A legacy or conventional device can be any suitable network device of a "second class of communication devices" that comprises a single communication interface and that is configured to operate across a single networking technology.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider)

Figure 4:
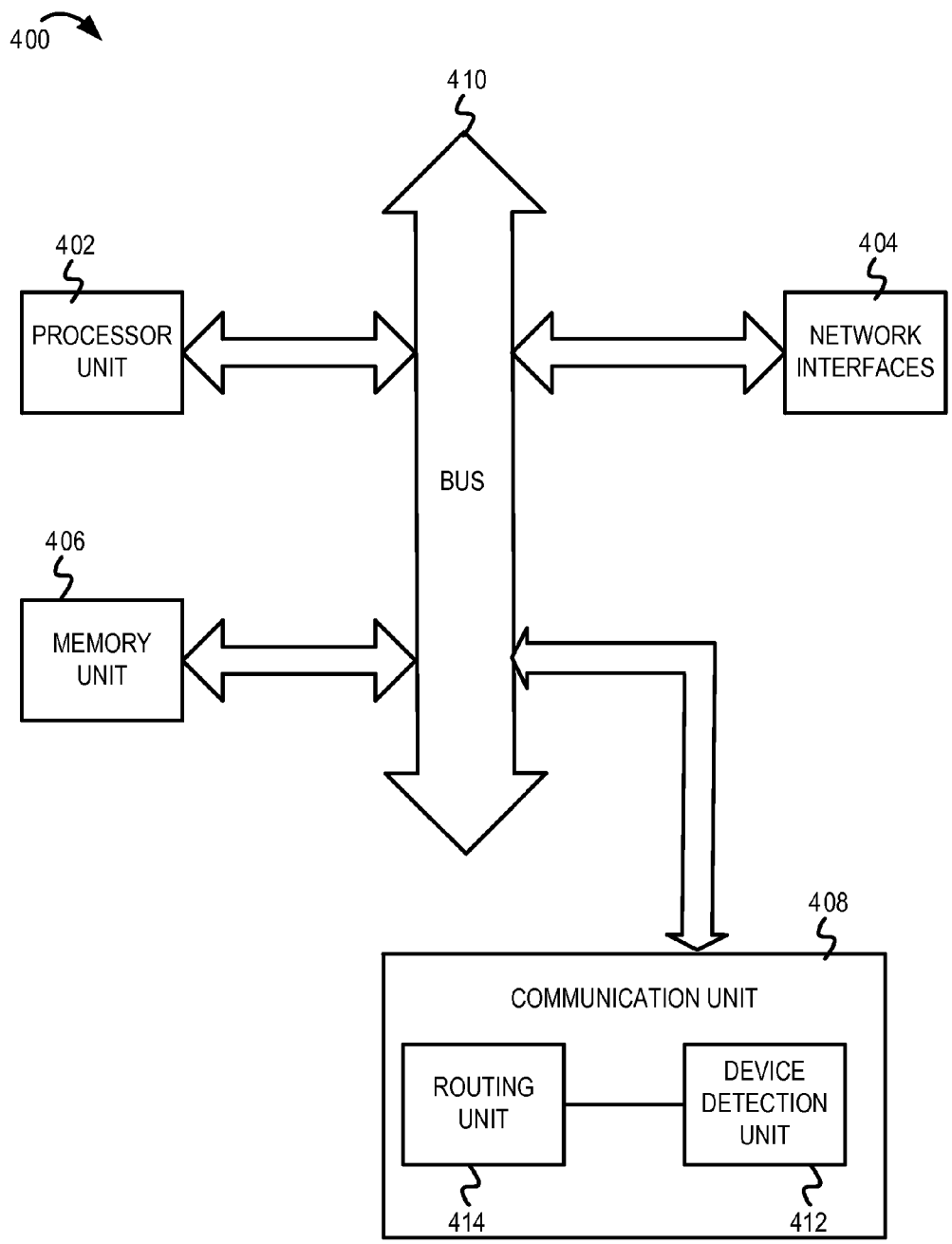
FIG. 4 is an example block diagram of one embodiment of an electronic device including a mechanism for discovery of legacy network devices and bridges in a hybrid communication network.

FIG. 4 is a block diagram of one embodiment of an electronic device 400 including a mechanism for discovery of legacy devices and bridges in a hybrid communication network. In some implementations, the electronic device 400 may be one of a laptop computer, a netbook, a mobile phone, a powerline communication device, a personal digital assistant (PDA), or other electronic systems comprising a hybrid communication unit configured to exchange communications across multiple communication networks (which form the hybrid communication network). The electronic device 400 includes a processor unit 402 (possibly including multiple processors, multiple cores, multiple nodes, and/or implementing multi-threading, etc.). The electronic device 400 includes a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 400 also includes a bus 410 (e.g., PCI, ISA, PCI-Express, HyperTransport®, InfiniBand®, NuBus, AHB, AXI, etc.), and network interfaces 404 that include at least one of a wireless network interface (e.g., a WLAN interface, a Bluetooth® interface, a WiMAX interface, a Zig-Bee® interface, a Wireless USB interface, etc.) and a wired network interface (e.g., an Ethernet interface, a powerline communication interface, etc.). In some implementations, the electronic device 400 may support multiple network interfaces—each of which is configured to couple the electronic device 400 to a different communication network.

The electronic device 400 also includes a communication unit 408. The communication unit 408 comprises a device detection unit 412 and a routing unit 414. As described above in FIGS. 1-3, the communication unit 408 implements functionality to determine whether a hybrid communication network that comprises the electronic device 400 also comprises one or more legacy devices (also known as conventional devices). The communication unit 408 can also determine whether the electronic device 400 and one or more other hybrid devices in the hybrid communication network are located on different network segments coupled by a legacy learning bridge (also known as a conventional learning bridge). Any one of these functionalities may be partially (or entirely) implemented in hardware and/or on the processor unit 402. For example, the functionality may be implemented with an application specific integrated circuit, in logic implemented in the processor unit 402, in a co-processor on a peripheral device or card, etc. Further, realizations may include fewer or additional components not illustrated in FIG. 4 (e.g., video cards, audio cards, additional network interfaces, peripheral devices, etc.). The processor unit 402, the memory unit 406, and the network interfaces 404 are coupled to the bus 410. Although illustrated as being coupled to the bus 410, the memory unit 406 may be coupled to the processor unit 402.

While the embodiments are described with reference to various implementations and exploitations, it will be understood that these embodiments are illustrative and that the scope of the inventive subject matter is not limited to them. In general, a mechanism for discovery of conventional devices and bridges in a hybrid communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:

detecting, at a first network device of a first class of network devices, a packet originating from a second network device of a second class of network devices;

determining, at the first network device, that the second network device is communicatively located adjacent to at least one network interface of the first network device when the packet does not include a tag associated with the first class of network devices;

transmitting, from the first network device, a protocol message associated with the first class of network devices, the protocol message indicating that the second network device is communicatively located adjacent to the first network device;

and determining whether a network bridge of the second class of network devices is communicatively located between a first network segment associated with the first network device and a second network segment associated with a third network device of the first class of network devices based at least in part on whether a probe message transmitted from the first network device to the second network device is detected by the third network device, the probe message associated with the first class of network devices.

2. The method of claim 1, further comprising:
transmitting the probe message from the first network device to the second network device; and
determining whether the probe message was detected by the third network device of the first class of network devices.

3. The method of claim 2, further comprising:
determining that the network bridge is communicatively located between the first network segment and the second network segment in response to determining that the probe message was not detected by the third network device; and
determining that the second network device and the third network device are associated with a common network segment in response to determining that the probe message was detected by the third network device.

4. The method of claim 1, further comprising:
inserting, at the first network device, the tag in the packet; and
forwarding the packet including the tag.

5. The method of claim 1, wherein the protocol message comprises one of an adjacent device identification message, a beacon message, or a periodic synchronization message.

6. A method comprising:
determining, at a first network device of a first class of network devices, that the first network device is communicatively located adjacent to a second network device of a second class of network devices in a communication network based, at least in part, on detecting a packet from the second network device that does not include a tag associated with the first class of network devices;
transmitting a probe message from the first network device to the second network device;
determining whether the probe message was detected by a third network device of the first class of network devices; and
determining that a first network segment associated with the first network device is communicatively coupled to a second network segment associated with the third network device via a network bridge device of the second class of network devices in response to determining that the probe message was not detected by the third network device.

7. The method of claim 6, wherein the first network device and the third network device are network bridge devices of the first class of network devices.

8. The method of claim 6, further comprising:
determining that the second network device and the third network device are associated with a common network segment, in response to determining that the probe message was detected by the third network device.

9. The method of claim 6, wherein determining that the first network device is communicatively located adjacent to the second network device comprises:
receiving, at a network interface of the first network device, the packet from the second network device; and
reading the packet to determine whether the packet includes the tag.

10. The method of claim 6, wherein in response to determining that the first network device is communicatively located adjacent to the second network device, the method further comprises:
determining whether the packet is to be forwarded to a destination device of the communication network; and
in response to determining that the packet is to be forwarded to the destination device,
inserting the tag in the packet, and
forwarding the packet to the destination device.

11. The method of claim 6, further comprising:
providing, to at least the third network device, an indication that the first network device is communicatively located adjacent to the second network device.

12. The method of claim 6, further comprising identifying a network interface of the third network device that is communicatively located adjacent to the second network device in response to detecting a notification message from the third network device that indicates that the network interface of the third network device is communicatively located adjacent to the second network device.

13. The method of claim 6, wherein transmitting the probe message to the second network device further comprises:
negotiating, with the third network device, a communication schedule in which to probe the second network device; and
transmitting the probe message to the second network device in accordance with the communication schedule.

14. The method of claim 6, wherein transmitting the probe message from the first network device to the second network device further comprises:
determining a destination address associated with the second network device based, at least in part, on a source address associated with the packet; and
transmitting the probe message from the first network device to the destination address.

15. The method of claim 14, wherein the destination address associated with the second network device comprises a media access control (MAC) address associated with the second network device.

16. The method of claim 6, wherein determining whether the probe message was detected by the third network device comprises:
querying the third network device to determine whether the probe message was detected by the third network device; and
receiving a response message from the third network device indicating whether the probe message was detected by the third network device.

17. The method of claim 6, wherein the first network device and the third network device are hybrid devices, the second network device is a legacy communication device, and the network bridge device is a legacy bridge.

18. A first network device of a first class of network devices, the first network device comprising:
a network interface; and
a device detection unit coupled with the network interface, the device detection unit operable to:
determine that the first network device is communicatively located adjacent to a second network device of a second class of network devices in a communication network based, at least in part, on detecting a packet from the second network device that does not include a tag associated with the first class of network devices;
transmit, via the network interface, a probe message from the first network device to the second network device;

determine whether the probe message was detected by a third network device of the first class of network devices; and determine that a first network segment associated with the first network device is communicatively coupled to a second network segment associated with the third network device via a network bridge device of the second class of network devices in response to the device detection unit determining that the probe message was not detected by the third network device.

19. The first network device of claim 18, wherein the device detection unit is further operable to:

determine that the second network device and the third network device are associated with a common network segment, in response to the device detection unit determining that the probe message was detected by the third network device.

20. The first network device of claim 18, wherein in response to the device detection unit determining that the first network device is communicatively located adjacent to the second network device, the device detection unit is further operable to:

determine whether the packet is to be forwarded to a destination device of the communication network; and in response to the device detection unit determining that the packet-is to be forwarded to the destination device, insert the tag in the packet, and forward the packet with the tag to the destination device.

21. The first network device of claim 18, wherein the device detection unit operable to transmit the probe message to the second network device further comprises the device detection unit operable to:

negotiate, with the third network device, a communication schedule in which to probe the second network device; and transmit the probe message to the second network device in accordance with the communication schedule.

22. The first network device of claim 18, wherein the device detection unit operable to transmit the probe message to the second network device further comprises the device detection unit operable to:

determine a destination address associated with the second network device based, at least in part, on a source address associated with the packet; and transmit the probe message from the first network device to the destination address.

23. A non-transitory machine-readable medium having instructions stored therein, which when executed by a processor of a first network device of a first class of network devices, cause the first network device to:

detect a packet originating from a second network device of a second class of network devices, the packet not including a tag associated with the first class of network devices;

determine that the second network device is communicatively located adjacent to the first network device based, at least in part, on detecting that the packet does not include the tag;

transmit a probe message from the first network device to the second network device;

determine whether the probe message was detected by a third network device of the first class of network devices; and determine that a first network segment associated with the first network device is communicatively coupled to a second network segment associated with the third network device via a network bridge device of the second class of network devices in response to determining that the probe message was not detected by the third network device.

24. The non-transitory machine-readable medium of claim 23, wherein the instructions further cause the first network device to:

determine that the second network device and the third network device are associated with a common network segment, in response to determining that the probe message was detected by the third network device.

25. The non-transitory machine-readable medium of claim 23, wherein the instructions further cause the first network device to:

provide, to at least the third network device, an indication that the first network device is communicatively located adjacent to the second network device.

26. The non-transitory machine-readable medium of claim 23, wherein the instructions to cause the first network device to transmit the probe message from the first network device to the second network device comprises instructions to cause the first network device to:

determine a destination address associated with the second network device based, at least in part, on a source address associated with the packet; and transmit the probe message from the first network device to the destination address.

* * * * *